United States Patent Office 3,547,979
Patented Dec. 15, 1970

3,547,979
HERBICIDAL CARBAMOYLOXYPHENYL N-ALKOXYUREAS
Richard K. Brantley, Westminster, Wilmington, Del., assignor to E. I. du Pont de Nemours and Company, Wilmington, Del., a corporation of Delaware
No Drawing. Filed Apr. 12, 1968, Ser. No. 721,060
Int. Cl. C07c 127/18
U.S. Cl. 260—479
2 Claims

ABSTRACT OF THE DISCLOSURE

The carbamoyloxyphenyl N-alkoxy ureas such as 1-[m-(t-butylcarbamoyloxy)phenyl] - 3 - methoxy-3-methylurea are useful as selective herbicides.

BACKGROUND OF THE INVENTION

This invention relates to novel alkylcarbamoyloxyphenyl N-alkoxyureas which are useful as herbicides. More particularly, the compounds of this invention, when applied as hereinafter described, are useful as selective herbicides.

It is known that chlorophenyl N-methoxy ureas are useful as selective herbicides. One publication, representative of the herbicidal art, U.S. Pat. 3,069,244, discloses compounds such as N-(4-chlorophenyl)-N'-methyl-N'-methoxyurea and N-(3,4-dichlorophenyl)-N'-methyl-N'-methoxyurea as selective herbicides.

However, the art contains no suggestions that compounds such as the alkylcarbamoyloxyphenyl N-alkyl-N-alkoxyureas of my invention are useful as selective herbicides.

SUMMARY OF THE INVENTION

This invention relates to compounds represented by the following formula (I) 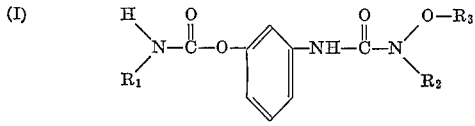

where $R_1$ is alkyl of one through six carbons;
$R_2$ is alkyl of one through four carbons; and
$R_3$ is alkyl of one through two carbons.

This invention also relates to a method for the control of undesired plants which comprises applying an herbicidally effective amount of a compound of Formula I to the locus to be protected. Preferably, the compound of Formula I is employed at a rate of application which selectively controls undesirable plants, hereinafter called weeds, while causing no objectionable damage to desirable plants, hereinafter called crops.

This invention further relates to an herbicidal composition composed of an effective amount of a compound of Formula I in combination with suitable agricultural adjuvants and modifiers.

DESCRIPTION OF THE INVENTION

The compounds of my invention can be viewed as featuring a N-substituted carbamoyloxy functional group and an N-alkyl N-alkoxy substituted ureido functional group. In general, methods for preparing each type of functional group and introducing such groups onto a benzene ring are well known to the art. However, when preparing the compounds of this invention, care must be taken to choose a method compatible with both functional groups.

PREPARATION

Aromatics having a carbamoyloxy function are generally prepared by reacting a phenol with an isocyanate, but can also be prepared by reaction of the phenol first with phosgene and then with the appropriate amine. This reaction must be carried out in a manner that does not, as pointed out above, interfere with the ureido function or its precursor.

The alkoxyureido function can be introduced by reacting an appropriate isocyanate with the desired N-alkoxy-N-alkylamine or alternatively by reacting an appropriate aniline with an N-alkoxy-N-alkylcarbamylhalide in the presence of an acid acceptor.

I have found that the compounds of this invention can be prepared in the following manner. First, m-nitrophenol is treated with an appropriate isocyanate to give a m-nitrophenylcarbamate. The nitro group is reduced. The resultant amine is converted to an isocyanate. The isocyanate is treated with an appropriate N,O-dialkylhydroxylamine to produce the desired alkylcarbamoyloxyphenyl-N-alkoxy-N-alkylurea.

The following examples are presented to further illustrate a method which can be used to prepare the compounds of this invention. In the following examples, parts and percentages are by weight unless otherwise indicated.

EXAMPLE 1

A solution of 13.9 parts m-nitrophenol in 100 parts tetrahydrofuran is prepared. To this solution is added 12 parts t-butylisocyanate followed by 0.2 part triethylamine. The resulting mixture is allowed to stand at about 25° C. for 20 hours. The mixture is then poured into 1000 parts ice water. Sufficient dilute sodium hydroxide is added to render the entire mixture weakly alkaline. The mixture is stirred until crystallization is induced. The solids are collected, washed with ice water, dried, and found to be m-nitrophenyl N-t-butylcarbamate, M.P. 77° C.

EXAMPLE 2

The procedure of Example 1 is repeated substituting 6 parts methylisocyanate for the t-butylisocyanate of Example 1 to produce m-nitrophenyl N-methylcarbamate, M.P. 130° C.

EXAMPLES 3–6

The procedure of Example 1 is repeated substituting an equivalent amount of the indicated "Isocyanate" for the t-butylisocyanate of Example 1 to produce the indicated "Carbamate Ester."

| Ex. | Isocyanate | Carbamate ester |
|---|---|---|
| 3 | Ethylisocyanate | m-Nitrophenyl N-ethylcarbamate. |
| 4 | Isopropylisocyanate | m-Nitrophenyl N-isopropylcarbamate. |
| 5 | Cyclohexylisocyanate | m-Nitrophenyl N-cyclohexylcarbamate. |
| 6 | n-Hexylisocyanate | m-Nitrophenyl N-n-hexylcarbamate. |

EXAMPLE 7

Twenty parts m-nitrophenyl N-methylcarbamate is dissolved in 100 parts ethyl acetate. To this solution is added 1.0 part 10% palladium on carbon catalyst. This mixture is agitated under a hydrogen atmosphere at a pressure of from 1 to 4 atmospheres until the absorption of hydrogen essentially stops. The catalyst is removed by filtration and the ethyl acetate is evaporated under reduced pressure. The residue is m-aminophenyl N-methylcarbamate, M.P. 86–90° C.

When m-nitrophenyl N t-butylcarbamate is reduced as described above, the product obtained is m-aminophenyl N-t-butylcarbamate, M.P. 93–96° C. The desired m-amino-phenylcarbamates can be obtained from the corresponding m-nitrophenylcarbamates using the method described in Example 7 above.

EXAMPLE 8

Twenty-one parts m-aminophenyl N-t-butylcarbamate is dissolved in a solution of 200 parts tetrahydrofuran and 23 parts triethylamine. This mixture is added to a solution of 18 parts phosgene dissolved in 100 parts tetrahydrofuran. The addition is carried out with vigorous stirring and the temperature is maintained at −5° C. When the addition is complete, the reaction mixture is stirred for a few minutes and then quickly filtered. The filter cake is washed with a little tetrahydrofuran and discarded. The filtrate and wash are combined and evaporated under reduced pressure to yield crude m-(t-butylcarbamoyloxy)phenyl isocyanate, M.P. 53–67° C. The product can be purified by recrystallization from cyclohexane.

EXAMPLE 9

The m-(t-butylcarbamoyloxy)phenyl isocyanate prepared above (4.7 parts) is dissolved in 40 parts benzene. To this solution 2 parts N,O-dimethylhydroxylamine is added. The mixture is allowed to stand overnight and the solvent is then evaporated. The residue is purified by recrystallization from acetonitrile to yield pure 1-[m-(t-butylcarbamoyloxy)phenyl]-3-methoxy - 3 - methylurea, M.P. 147°–150° C.

EXAMPLES 10–14

The procedure of Example 9 is repeated substituting an equivalent amount of the indicated "Isocyanate" for the m-(t-butylcarbamoyloxy)phenyl isocyanate of Example 9 and an equivalent amount of the indicated "Amine" for the N,O-dimethylhydroxylamine of Example 9 to form the indicated "Product."

| Ex. | Isocyanate | Amine | Product |
| --- | --- | --- | --- |
| 10 | m-Methylcarbamoyloxy-phenylisocyanate. | N-n-butyl-O-ethylhydroxylamine | 1-(m-methylcarbamoyloxyphenyl)-3-butyl-3-ethoxyurea. |
| 11 | m-Cyclohexylcarbamoyloxyphenyl-isocyanate. | N-methyl-O-ethylhydroxylamine | 1-(m-cyclohexylcarbamoyloxyphenyl)-3-methyl-3-ethoxyurea. |
| 12 | m-Isopropylcarbamoyloxyphenyl-isocyanate. | N-n-propyl-O-methylhydroxylamine | 1-(m-isopropylcarbamoyloxyphenyl)-3-propyl-3-methoxyurea. |
| 13 | m-(2-hexylcarbamoyloxyphenyl)-isocyanate. | N,O-dimethylhydroxylamine | 1-[m-(2-hexylcarbamoyloxyphenyl)]-3-methoxy-3-methyl urea. |
| 14 | m-Isopropylcarbamoyloxyphenyl-isocyanate. | N,O-dimethylhydroxylamine | 1-(m-isopropylcarbamoyloxyphenyl)-3-methoxy-3-methylurea. |

FORMULATION

Compositions of this invention suitable for practical use as herbicides will include, in addition to one or more compounds of Formula I, surface-active agents, solid or liquid diluents and other materials as desired to produce wettable powders, suspensions, emulsifiable concentrates, dusts, solutions, granules, pellets, or high-strength compositions.

The surface-active agents, or surfactants, useful in the formulations of this invention act as wetting, dispersing and emulsifying agents which assist dispersion of the active material in the spray, and improve wetting of waxy foliage and the like by the spray. The surfactants can include such anionic, non-ionic and cationic agents as have been used heretofore in pesticidal compositions of similar type. A detailed list of such agents can be found in "Detergents and Emulsifiers Annual," (John W. McCutcheon, Inc.). Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isothionate. Among the non-ionic surfactants, preferred ones include octylphenyl polyethylene glycol ethers, dodecylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for further improvement of contact activity, the additional surfactant is preferably mixed in the spray tank.

Powder and dust formulations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sulfur and lime. The compositions are made by thoroughly blending the active ingredient with the diluent and other additives. Usually a grinding step, as in a hammer mill or fluid energy mill, is included. The particles in dust and powder preparations are preferably less than 50 microns in average diameter.

Preferred wettable powder formulations will contain 40% or more active ingredient together with sufficient surfactant and inert diluent to permit dispersion in water for spray application. Compositions intended for dust application will generally contain less than 50% active ingredient.

Powdered compositions can be converted to granules by adding moisture, treating mechanically and drying. Mechanical devices such as granulating pans, mixers and extruders can be used. Water soluble binders, such as inorganic salts, urea, ligninsulfonates, methyl cellulose, and the like, can be included in these particulate formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants may also be included in formulations of the latter type.

Suspension formulations can be made in water, in organic solvents, or in mixtures of water and water-miscible organic solvents in which the active ingredient has a solubility under about 0.1%. The preparations can include, in addition to the active ingredient and liquid carrier, surfactants, viscosity control agents, anti-microbial agents and other modifiers. They are prepared by grinding the components in a sand mill or pebble mill until a suitable particle size is obtained. Preferably, the average particle size obtained is under 20 microns. Water is the preferred liquid carrier. Hydrocarbon carriers should have boiling points above about 125° C. for safety in handling. Suspensions in hydrocarbons are suitable for extension in herbicidal or other spray oils and, by inclusion of a suitable emulsifying agent, can also be made sprayable from water.

The compounds of this invention are generally not sufficiently soluble in cheap, water immiscible solvents for economic use in emulsifiable concentrates. For particular purposes, low strength emulsifiable mixtures can be made in the conventional way using chlorinated hydrocarbons, such as methylene chloride and chloroform, as solvents. Solutions in polar solvents such as dimethylformamide or dimethyl sulfoxide may be used directly for low volume applications or extended with oil or other solvents.

All compositions intended for spray use can contain minor amounts of additives to reduce foam, inhibit corrosion, prevent claying, reduce caking, etc., as the conditions of use may dictate. The conditions of need for and use of such additives are generally known in the art.

The following examples are presented to illustrate typical formulations of this invention as discussed above.

EXAMPLE 15

The ingredients listed below are combined and stirred with warming to produce a solution suitable for low volume applications.

| | Percent |
|---|---|
| 3 - [3 - (2 - hexylcarbamoyloxy)phenyl] - 1-propyl-1-ethoxyurea | 25 |
| Dimethylsulfoxide | 75 |

EXAMPLE 16

A wettable powder can be prepared as follows:

| | Percent |
|---|---|
| 3 - (3 - isopropylcarbamoyloxyphenyl)-1-methoxy-1-methylurea | 50.0 |
| Dioctylsodiumsulfosuccinate | 1.5 |
| Sodium lignin sulfonate | 3.0 |
| Methylcellulose (low viscosity) | 1.5 |
| Attapulgite | 10.0 |
| Kaolinite | 34.0 |

The ingredients are thoroughly blended, passed through an air mill to produce an average particle size of under 15 microns, reblended, passed through a sieve with a 0.3 mm. opening and packaged.

EXAMPLE 17

A wettable powder is prepared having the formula:

| | Percent |
|---|---|
| 3 - (3 - cyclohexylcarbamoyloxyphenyl)-1-methoxy-1-methylurea | 80 |
| Sodiumalkylnaphthalene sulfonate | 2 |
| Sodium lignin sulfonate | 2 |
| Synthetic amorphous silica | 3 |
| Kaolinite | 13 |

The ingredients are thoroughly blended, passed through a hammer mill to produce a particle size under 40 microns, reblended, sifted through a 0.3 mm. sieve and packaged.

EXAMPLE 18

A wettable powder is prepared having the formula:

| | Percent |
|---|---|
| 3 - [3 - (t - butylcarbamoyloxy)phenyl]-1-methoxy-1-methylurea | 65 |
| Dodecylphenolpolyethyleneglycol ether | 2 |
| Sodium lignin sulfonate | 4 |
| Magnesium carbonate | 6 |
| Montmorillonite (calcined) | 23 |

The ingredients are thoroughly blended by first mixing the solid ingredients and then spraying the liquid surfactant on the mix while blending is continued. The mixture is then ground in a hammer mill to a particle size of less than 200 microns. The material is then reblended, sifted through a 0.3 mm. seive and packaged.

EXAMPLE 19

A high strength concentrate of the following formula can be prepared by blending the ingredients and then milling the mixture until it will pass through a 0.3 mm. seive.

| | Percent |
|---|---|
| 3 - [3 - (methylcarbamoyloxy)phenyl]-1-ethoxy-1-ethylurea | 98.5 |
| Silica aerogel | 0.5 |
| Synthetic amorphous fine silica | 1.0 |

The above prepared concentrate is suitable for shipment to be repackaged in the area of application or can be formulated at the plant with available extenders. For example, the following dust of the following formula can be prepared.

| | Percent |
|---|---|
| High strength concentrate | 25.4 |
| Pyrophyllite | 74.6 |

EXAMPLE 20

An extruded pellet formulation can be prepared as follows:

| | Percent |
|---|---|
| 3 - (3 - isopropylcarbamoyloxyphenyl) - 1 - butyl - 1-methoxy urea | 25 |
| Anhydrous sodium sulfate | 10 |
| Calcium/magnesium lignin sulfonate | 5 |
| Sodium alkylnaphthalene sulfonate | 1 |
| Calcium/magnesium bentonite | 57 |

The ingredients are blended, hammer milled and then moistened with about 12% water. The mixture is extruded as 3 mm. diameter cylinders and cut as extruded to produce 3 mm. x 3 mm. pellets which are then dried. These may be used as such or crushed to a size which will pass through a 0.84 mm. seive but will not pass through a 0.42 mm. seive. The crushed pellets are packed for use and the fines are recycled.

EXAMPLE 21

A granular formulation can be prepared as follows:

| | Percent |
|---|---|
| Wettable powder of Example 16 | 15 |
| Gypsum | 69 |
| Potassium sulfate | 16 |

The ingredients are blended in a rotating mixer and water sprayed on to accomplish granulation. When most of the material has reached the desired range of 1.0 to 0.42 mm. the granules are removed, dried and screened Oversize material is crushed to produce additional material in the desired range. The granules prepared as above contain 12% active ingredient.

EXAMPLE 22

A granular formulation can be prepared as follows:

| | Percent |
|---|---|
| Wettable power of Example 17 | 10 |
| Attapulgite clay granules (0.84–0.42 mm.) | 90 |

An aqueous slurry of the wettable powder containing 50% solids is sprayed on the surface of warmed attapulgite granules in a V-blender. The granules are dried and packaged. They contain 6.5% active ingredient.

Application

The compounds of this invention can be employed at rates of up to about 20 kilograms per hectare for long-term and complete control of any type of undesirable vegetation. It is preferred, however, to employ the compounds of this invention at application rates of 0.25 to 4 kilograms per hectare to selectively control weeds in crops such as sugarcane, pineapple, asparagus and soybeans.

EXAMPLE 23

The formulation of Example 16 is extended with water with stirring to form a suspension containing 0.16 kg. of the active per 100 liters of suspension. The suspension is applied to a field of soybeans freshly planted in a silt loam soil at a rate of 300 liters per hectare. This treatment provides complete control of a mixture of weed species including crabgrass (*Digitaria spp.*), giant foxtail (*Setaria faberii*), lamb's-quarter (*Chenopodium album*) and smartweed (*Polygonum pennsylvanicum*), which species heavily infest an untreated adjacent control plot. Weed control extends for a period of seven weeks after treatment. The treated area produces a highly satisfactory crop yield.

EXAMPLE 24

The wettable powder formulation of Example 17 is extended with water to produce a uniform suspension containing 5 kg. of formulation per 400 liters of liquid. The suspension is applied to a one acre plot of ratoon sugarcane within 2 days after harvesting. The treatment results in excellent control of ragweed (*Ambrosia trifida*), goatweed (*Croton lindheimeri*), crabgrass (*Digitaria spp.*) and Johnson grass (*Sorghum halepense*) for a period of 9 weeks after application. The sugarcane freed from weed competition, develops a good crop.

EXAMPLE 25

The wettable powder formulation of Example 18 is extended with water to produce a uniform suspension containing 1 kg. of formulation per 40 liters of water. The suspension is applied at a rate of 800 liters per hectare to a mixed stand of weed species infesting an area around an oil storage tank. Included among the undesirable vegetation are weed species such as pigweed (*Amaranthus retroflexus*), brome grass (*Bromus spp.*), dogbane (*Apocynum spp.*), crabgrass (*Digitaria spp.*), plantain (*Plantago spp.*), sheep sorrel (*Rumex acetosella*), dandelion (*Taraxacum officinale*), spurge (*Euphorbia spp.*) and barnyardgrass (*Echinochloa crusgalli*). Complete control of all vegetation is obtained throughout the duration of the growing season which minimized the fire hazard in the treated area.

EXAMPLE 26

The dust prepared as described in Example 19 is applied by means of a fertilizer spreader to a parking lot which normally is heavily infested with dandelion (*Taraxacum officinale*), cinquefoil (*Potentilla spp.*), crabgrass (*Digitaria spp.*) and annual bluegrass (*Poa anna*). The application is made at the beginning of the growing season at a rate of 40 kg. per hectare of the 25% active formulation. Good control of all undesirable vegetation results for a period of 5 months after treatment.

EXAMPLE 27

Pellets prepared as in Example 20 are manually applied at a rate of 20 kg. of pellets per hectare to an area at the foot of an advertising billboard which contains a vigorous stand of yellow foxtail (*Setaria glauca*), crabgrass (*Digitaria spp.*), and blackeyed susan (*Rudbeckia serotina*). The treated stand of weeds dies within three weeks after application and the treated area remains bare of vegetation for a period of 63 days after treatment.

EXAMPLE 28

A granular formulation prepared as described in Example 21 is manually applied at a rate of 150 kg. of formulation per hectare as a spot treatment to eradicate clumps of quackgrass (*Agropyron repens*) scattered throughout a corn field. The chemical application kills both the corn and the quackgrass in the immediate area. The quackgrass does not recover and corn can be planted in the treated area the following year without suffering ill effects from the chemical.

EXAMPLE 29

Granules prepared according to the method of Example 22 are applied by helicopter at a rate of 225 kg. per hectare to a forest firelane which is beginning to be reinfested with a mixture of weed species including green foxtail (*Setaria viridis*), brome grass (*Bromus spp.*), red clover (*Trifolinum pratense*), milkweed (*Asclepias spp.*), and smartweed (*Polygonum spp.*). The treatment gives season-long control of all vegetation in the treated area of the firelane and has only a transitory harmful effect on the bordering trees.

EXAMPLE 30

A solution prepared as in Example 15 is extended with water to produce a composition which contains 1.5 kg. of active per 50 liters of water. This solution is uniformly applied by means of a bicycle-type herbicide sprayer to a 1000 m.² area of railroad ballast. The treatment causes the death of all weeds in the treated area within two weeks and prevents reinfestation of weed growth for an additional period of 9 weeks. The weeds present at the time of treatment include young giant foxtail (*Setaria faberii*), crabgrass (*Digitaria spp.*), cocklebur (*Xanthium spp.*) and dropseed (*Sporobolus neglectus*).

I claim:
1. A compound of the formula

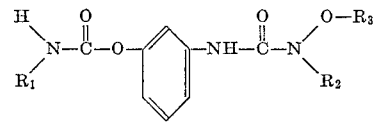

where $R_1$ is alkyl of one through six carbons;
$R_2$ is alkyl of one through four carbons; and
$R_3$ is alkyl of one through two carbons.

2. 1 - [m - (t - butylcarbamoyloxyphenyl)] - 3 - methoxy-3-methyl urea.

References Cited

UNITED STATES PATENTS 3,434,822   3/1969   Wilson et al. _____ 260—479

JAMES A. PATTEN, Primary Examiner

U.S. Cl. X.R.

71—106; 260—468